(12) United States Patent
Guidi

(10) Patent No.: US 9,115,628 B2
(45) Date of Patent: Aug. 25, 2015

(54) FEED TUBE RESTRICTION FOR ON BOARD DIAGNOSTIC COMPLIANCE IN SECONDARY AIR INJECTION APPLICATIONS ON V-ENGINES

(71) Applicants: DENSO International America, Inc., Southfield, MI (US); DENSO CORPORATION, Kariya-shi, Aichi-ken (JP)

(72) Inventor: Paolo Guidi, Macomb, MI (US)

(73) Assignees: DENSO International America, Inc., Southfield, MI (US); DENSO CORPORATION, Kariya-shi, Aichi-ken ( * ) Notice: Subject to any disclaimer, the term of this patent is extended or adjusted under 35 U.S.C. 154(b) by 78 days.

(21) Appl. No.: 14/017,865

(22) Filed: Sep. 4, 2013

(65) Prior Publication Data
US 2015/0059323 A1    Mar. 5, 2015

(51) Int. Cl.
*F01N 3/00* (2006.01)
*F01N 3/02* (2006.01)
*F01N 3/10* (2006.01)
*F01N 3/20* (2006.01)
*F01N 3/30* (2006.01)

(52) U.S. Cl.
CPC .................. *F01N 3/30* (2013.01)

(58) Field of Classification Search
USPC ................... 60/289, 290, 323, 324
See application file for complete search history.

(56) References Cited

U.S. PATENT DOCUMENTS

| | | | |
|---|---|---|---|
| 6,983,590 B2 | 1/2006 | Roelle et al. | |
| 7,111,454 B2 | 9/2006 | Fulcher et al. | |
| 8,087,237 B2 * | 1/2012 | Komuro | 60/289 |
| 8,136,347 B2 | 3/2012 | Mac Ewen et al. | |

FOREIGN PATENT DOCUMENTS

GB    2440317    1/2008

* cited by examiner

*Primary Examiner* — Audrey K Bradley
*Assistant Examiner* — Dapinder Singh
(74) *Attorney, Agent, or Firm* — Harness, Dickey & Pierce, P.L.C.

(57) ABSTRACT

A flow restrictor for a secondary air injection system for an internal combustion engine. The flow restrictor includes a main body configured to be located between the intake end and a first injecting end of the supply conduit of the secondary air injection system. The main body defines a restricting orifice configured to reduce propagation of pressure fluctuations between the first injecting end a second injecting end. The main body includes a first connecting portion configured to connect to the supply conduit proximal to the intake end and a second connecting portion configured to connect to the supply conduit proximal to the first injecting end.

16 Claims, 4 Drawing Sheets

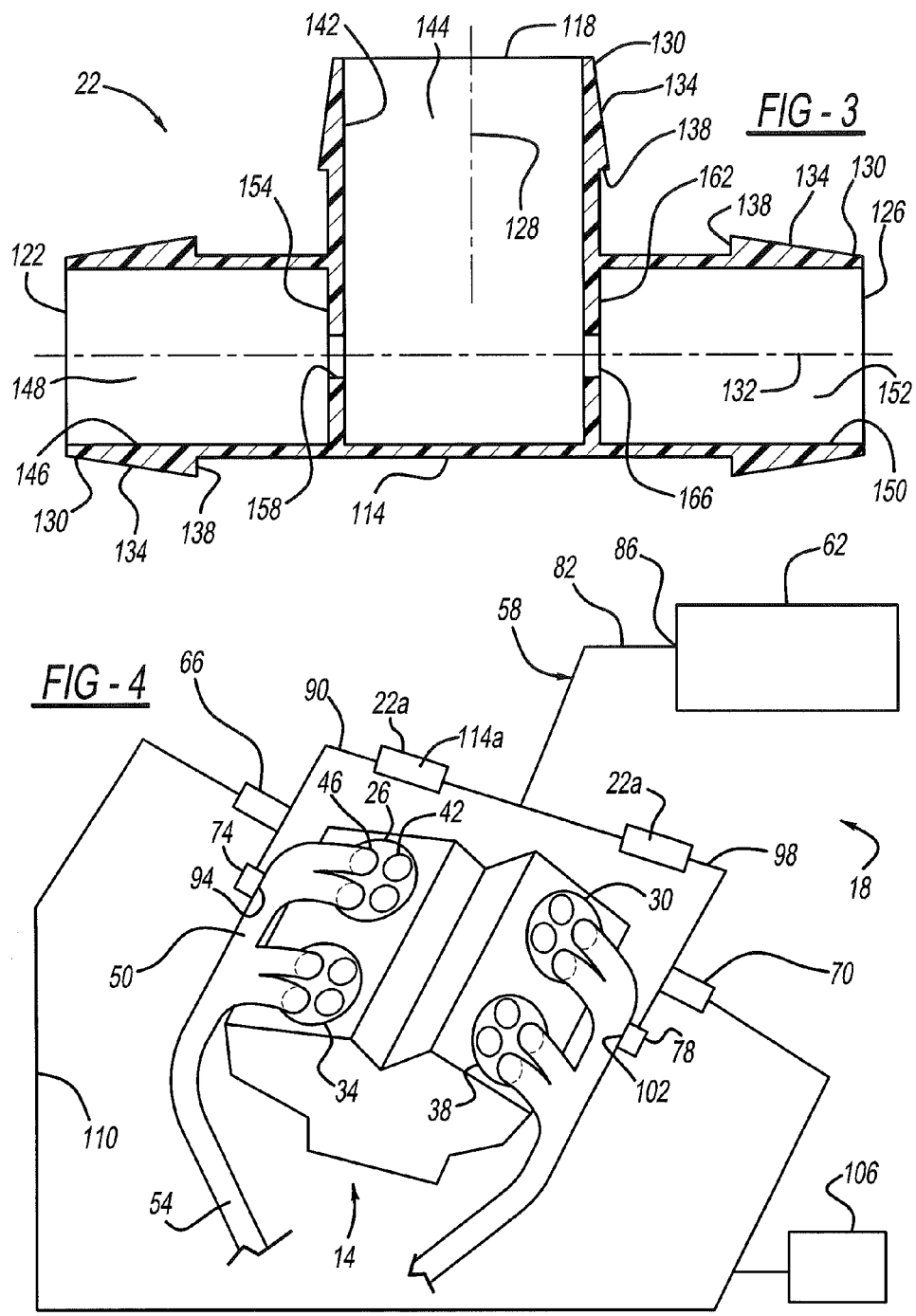

FEED TUBE RESTRICTION FOR ON BOARD DIAGNOSTIC COMPLIANCE IN SECONDARY AIR INJECTION APPLICATIONS ON V-ENGINES

FIELD

The present disclosure relates to feed tube restrictions for on-board diagnostic compliance in secondary air injection applications on V-engines.

BACKGROUND

This section provides background information related to the present disclosure, which is not necessarily prior art.

Incomplete combustion of the gasses and fuel mixture within the combustion chamber of an internal combustion engine can occur for a variety of reasons. Incomplete combustion can lead to inefficient operation of emission control equipment, such as catalytic converters, and increased emissions.

Secondary air injection systems ("SAI systems") are one way to reduce the emission of the products of incomplete combustion. SAI systems inject external air into the exhaust, upstream of emissions equipment, such as the catalytic converter. The injected air reacts with the incompletely combusted exhaust and, in the case of a catalytic converter, this reaction heats the catalytic converter to allow more efficient operation.

It can be beneficial to know when an SAI system develops a leak or becomes blocked. One method of detecting such a condition is by measuring pressures in the SAI system. Generally, certain pressure profiles are expected in an SAI supply line to a given cylinder head when the SAI valve is open to that cylinder head. Other pressure profiles are expected when the SAI valve for that particular cylinder head is closed. An alert, such as a check engine light, can inform users when the pressure profiles are not as expected. However, pressure fluctuations from other cylinder heads can propagate through the SAI system and cause pressure measurements for a given cylinder head to vary outside the expected profile, thus erroneously indicating an SAI system failure. This can be especially true for V-engines, where the cylinders on opposite sides of the "V" are particularly close and the SAI valve is open to one while closed to the other. The configuration of many SAI systems can allow opposite cylinder heads to cause pressure fluctuations in each other, causing erroneous failure indications.

SUMMARY

This section provides a general summary of the disclosure, and is not a comprehensive disclosure of its full scope or all of its features.

The present teachings provide for a flow restrictor for a secondary air injection system of a multiple cylinder internal combustion engine including a supply conduit with an intake end configured to supply air from outside the engine to first and second injecting ends configured to inject the air into an exhaust of first and second cylinder heads of the engine and a conveying section between the intake end and the first and second injecting ends. The flow restrictor includes a main body including a first connecting portion, a second connecting portion, and a restricting member. The first connecting portion defines a first orifice. The second connecting portion defines a second orifice fluidly coupled to the first orifice. The restricting member is located within one of the first and second connecting portions and defines a restricting orifice smaller than the first and second orifices. The restricting orifice is configured to reduce propagation of pressure fluctuations between the first injecting end a second injecting end. The main body is configured to be located between the intake end and the first injecting end. The first connecting portion is configured to connect to and form a seal with the supply conduit proximal to the intake end. The second connecting portion is configured to connect to and form a seal with the supply conduit proximal to the first injecting end.

The present teachings also provide for a flow restrictor for a secondary air injection system of a multiple cylinder internal combustion engine including a supply conduit with an intake end configured to supply air from outside the engine to first and second injecting ends configured to inject the air into an exhaust of first and second cylinder heads of the engine and a conveying section between the intake end and the first and second injecting ends. The flow restrictor includes a main body including a first connecting portion, a second connecting portion, a flow path, and a restricting member. The first connecting portion defines a first orifice. The second connecting portion defines a second orifice. The flow path extends from the first orifice to the second orifice. The restricting member is located in the flow path and defines a restricting orifice of a cross-sectional area smaller than the flow path to reduce propagation of pressure fluctuations between the first injecting end and a second injecting end. The main body is configured to be located between the intake end and the first injecting end. The first injecting end injects the air in a first mode and seals the supply conduit from the exhaust in a second mode. The second injecting end injects the air in the second mode and seals the supply conduit from the exhaust in the first mode. The first connecting portion is configured to connect to and form a seal with the supply conduit proximal to the intake end. The second connecting portion configured to connect to and form a seal with the supply conduit proximal to the first injecting end.

The present teachings also provide for a secondary air injection system for an internal combustion engine including a supply line, at least one flow restrictor, and at least two pressure measuring devices. The supply line is configured to supply air from outside the engine to an exhaust of at least two cylinder heads of the engine. The supply line includes an intake portion and at least two injection portions. Each injection portion has an intake end coupled to the intake portion, an injecting end coupled to the exhaust of one of the cylinder heads, and a flow path extending between the intake and injecting ends. Each flow restrictor is located between the injecting ends of the injection portions. The flow restrictor defines an orifice of a cross-sectional area smaller than a cross-sectional area of the flow path and configured to minimize propagation of pressure fluctuations between the cylinder heads. Each pressure measuring device is located along one of the injection portions between the intake and injecting ends of the corresponding injection portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 3 is a cross-section view of the feed tube restrictor of FIG. 2;

FIG. 4 is the secondary air injection system coupled to the internal combustion engine with feed tube restrictors in a second configuration;

Corresponding reference numerals indicate corresponding parts throughout the several views of the drawings.

DETAILED DESCRIPTION

Example embodiments will now be described more fully with reference to the accompanying drawings.

Figure 1:
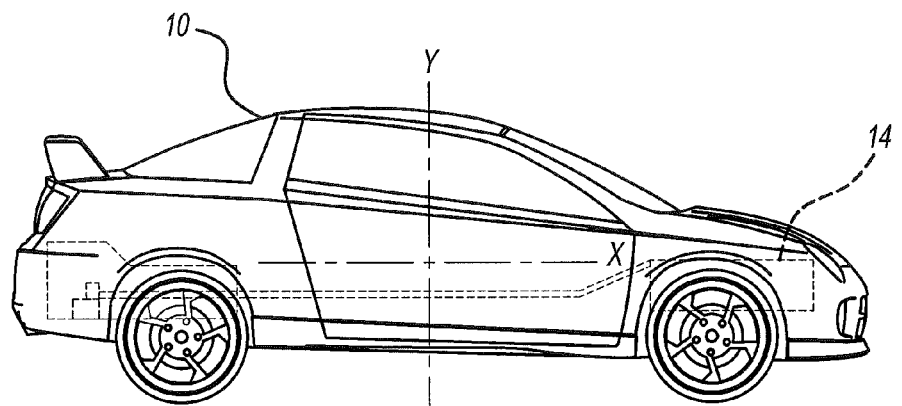
FIG. 1 is a representative vehicle including an internal combustion engine in accordance with the present teachings.

The present teachings are directed to a flow restrictor for a secondary air injection system ("SAIS") of an internal combustion engine ("ICE"), and a SAIS incorporating such a flow restriction. The ICE can be of any type, such as a piston-cylinder engine or a Wankel engine, for example, that employs more than one compression chamber. In the case of a piston-cylinder ICE, the pistons can be arranged in any configuration, such as inline, opposing, radial, W, or V, for example. The ICE may be located within a vehicle, such as an automobile, truck, machinery, aircraft, watercraft, or any other vehicle to provide power for locomotion, for example. However, it is also contemplated that the ICE could be used in other applications with or without a vehicle such as an electrical generator or to operate machinery, for example. FIG. 1 illustrates an example of a vehicle 10 with an ICE 14. First and second axis X and Y are shown relative to the vehicle 10. The first axis X is substantially horizontal relative to the vehicle 10. The second axis Y is substantially vertical relative to the vehicle.

Figure 2:
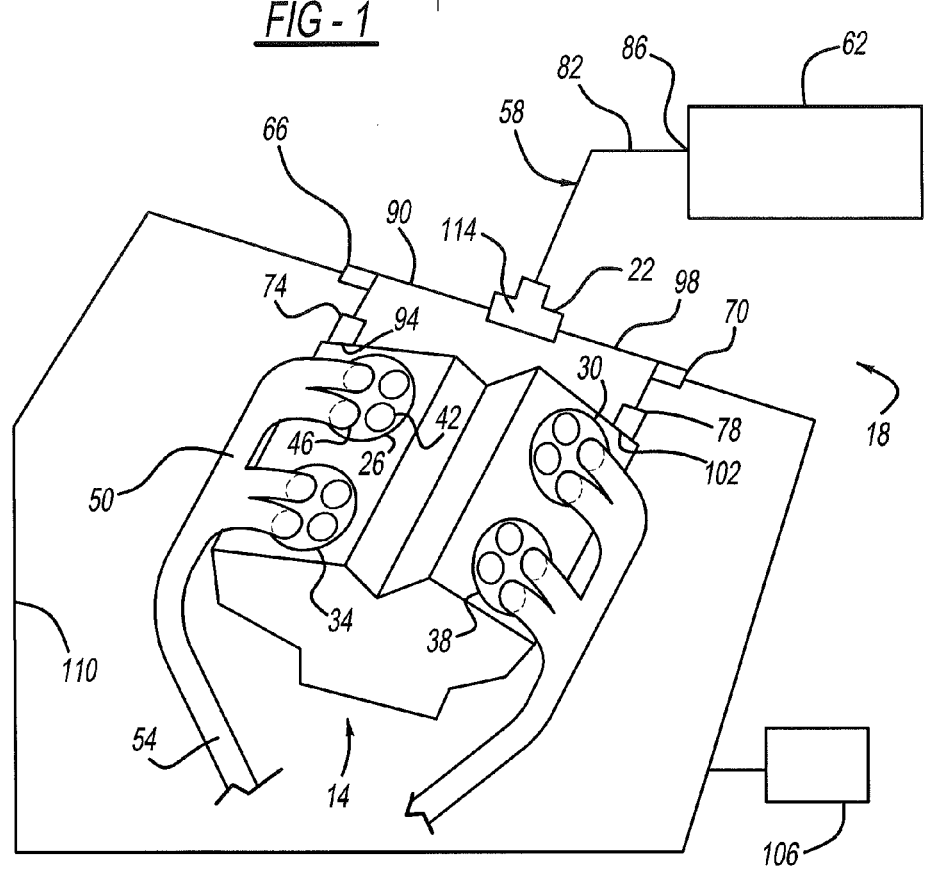
FIG. 2 is a secondary air injection system coupled to the internal combustion engine with feed tube restrictors in a first configuration.
Figure 6:
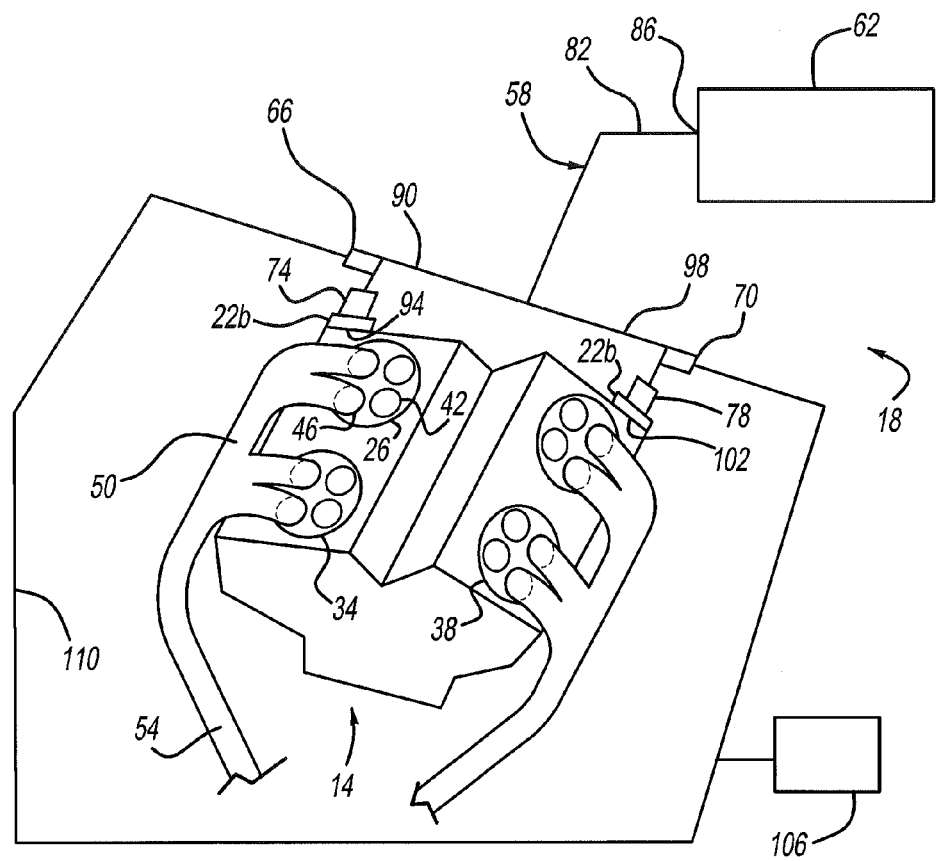
FIG. 6 is the secondary air injection system coupled to the internal combustion engine with feed tube restrictors in a third configuration.

FIGS. 2, 4, and 6 illustrate the ICE 14 and a SAIS 18 with flow restrictors in a first, second, and third configurations 22, 22a, 22b. The ICE 14 is illustrated as having first, second, third and fourth cylinder heads 26, 30, 34, 38, but the ICE 14 can include any number of cylinders and cylinder heads greater than one. In other words, the ICE 14 can include N cylinders and N cylinder heads, where N is an integer greater than one. While FIGS. 2, 4, 6, and 8 illustrate the ICE 14 as a V-engine, with the first and second cylinder heads 26, 30, on opposite sides of the V, it is understood that the first and second cylinder heads 26, 30, can be any two cylinder heads connected by the SAIS 18, including cylinder heads on the same side of the V of a V-engine.

Each cylinder head includes an intake port 42 for injecting air into the engine before combustion within the compression chamber. Each cylinder head includes an exhaust port 46 for expelling post combustion products from the combustion chamber. While each cylinder head is illustrated as having two intake and exhaust ports, other configurations, such as single, or any number of ports, are equally contemplated. The exhaust port 46 is coupled to an exhaust manifold 50. The exhaust manifold 50 provides a conduit for the exhaust of each cylinder head to be expelled from the vehicle 10 by way of an exhaust pipe 54.

The SAIS 18 can include a supply conduit 58, an air intake device 62, a first and second pressure measuring device 66, 70, and a first and second feed valve 74, 78. The supply conduit 58 can include an intake section 82 with an intake end 86, a first conveying section 90 with a first injecting end 94 coupled to the first cylinder head 26, and a second conveying section 98 with a second injecting end 102 coupled to the second cylinder head 30. The supply conduit 58 is an enclosed pathway for air received from outside the engine to flow between the intake end 86 and the first and second injecting ends 94, 102, and can be made up of tubes, pipes, hoses, connectors, valves, channels in the ICE 14, ports, or other elements configured to convey the air. The intake end 86 is configured to supply the air to the intake section 82. The intake section 82 is configured to supply the air to the first and second conveying sections 90, 98. The first and second conveying sections 90, 98 can fluidly connect the first and second injecting ends 94, 102, respectively, to the intake end 86. The first and second injecting ends 94, 102 are configured to inject the air into the exhaust of the first and second cylinder heads 26, 30 respectively. The first and second injecting ends 94, 102 can be coupled to the ICE 14 directly, such as at the engine block or cylinder head block for example, where a distribution system (not shown) can convey the air to individual cylinder heads. The distribution system can include channels or conduits within the ICE 14, or along a separate distribution conduit outside the ICE 14 for example. While FIGS. 2 and 6 illustrate the SAIS 18 connected in this way to the cylinder head block, the first and second injecting ends 94, 102 can be alternatively coupled to the exhaust manifold 50 or a distribution system (not shown) on or within the exhaust manifold 50, as illustrated in FIG. 4. The distribution system can be on or within the exhaust manifold 50, to convey the air to the exhaust of individual cylinder heads. The distribution system on or within the exhaust manifold 50 can include channels or conduits on or within the exhaust manifold 50 for example. It is contemplated that the SAIS 18 of FIGS. 2 and 6 can alternatively be connected to the exhaust manifold 50 or a distribution system located thereon. It is further contemplated that the SAIS 18 of FIG. 4 can alternatively be connected to the ICE 14 at the cylinder head block or a distribution system on or in the cylinder head block or engine block.

The air can be supplied to the intake end 86 by the air intake device 62. The air intake device 62 can be an air pump, for example, to actively supply air to the intake end 86. The air intake device 62 can be electrically driven, or be driven by the ICE 14, via a belt drive for example. In the case of an air pump, the SAIS 18 can be configured to maintain a pressure within the supply conduit 58, or can be configured to selectively supply air to the supply conduit 58.

The first and second pressure measuring devices 66, 70 can measure the pressure within the supply conduit 58 at their respective locations. The first and second pressure measuring devices 66, 70 can be coupled to the supply conduit 58 between the first and second injecting ends 94, 102, respectively, and the intake section 82. The first and second pressure measuring devices 66, 70 can be coupled to the supply conduit 58 at any point along the first and second conveying sections 90, 98, including the first and second feed valves 74, 78, for example. The first and second pressure measuring devices 66, 70 can be connected to a processing device 106 by one or more wires 110. The processing device 106 can be configured to determine if the SAIS 18 is functioning properly by evaluating pressures and pressure fluctuations within the SAIS 18.

The first and second feed valves 74, 78 can be coupled to the supply conduit 58 proximal to the first and second injecting ends 94, 102, respectively. The first and second feed valves 74, 78 can be configured to selectively move between an open position configured to allow the air to flow between the supply conduit 58 and the exhaust of the first and second cylinder heads 26, 30, respectively.

FIG. 2 illustrates the SAIS 18 in a first configuration with flow restrictor 22, which can include a main body 114 configured to be located between the intake section 82 and the first and second injecting ends 94, 102. The flow restrictor 22 is illustrated in more detail in FIG. 3. The main body 114 can include first, second, and third connecting portions 118, 122, 126, fluidly coupled to allow air to flow from the first connecting portion 118 to the second and third connecting portions 122, 126. The first connecting portion 118 can be positioned about a first flow axis 128. The second connecting portion 122 can be positioned about a second flow axis 132. The third connecting portion 126 can be positioned about the second flow axis, opposite the second connecting portion 122. The second flow axis 132 can be perpendicular to the first flow axis 128, with the first flow axis 128 intersecting the second flow axis 132 between the second and third connecting portions 122, 126, such that the main body 114 is substantially "T" shaped. The first connecting portion 118 can be coupled to the intake section 82, and thus coupled to the supply conduit 58 proximal to the intake end 86, while the second connecting portion 122 can be coupled to the first conveying section 90, and thus coupled to the supply conduit 58 proximal to the first injecting end 94. The third connecting portion 126 can be coupled to the second conveying section 98, and thus coupled to the supply conduit 58 proximal to the second injecting end 102.

The flow restrictor 22 is illustrated as a "T" shape, but any other configuration that splits the supply of air from the intake section 82 to the first and second conveying sections 90, 98 is contemplated, such as a "Y" shape, or where connecting portions 118, 122, 126 are all perpendicular to each other, for example. When the ICE 14 consists of more than two cylinders, multiple flow restrictors 22 can be used for each pair of cylinder heads, but it is also contemplated that the flow restrictor 22 can include more connecting portions, such that it can connect to more than two conveying sections. By locating the flow restrictor 22 in the supply conduit between the intake section 82 and the first and second conveying sections 90, 98, the interior of the flow restrictor 22 is primarily exposed to the fresh air from outside the engine. This minimizes exposure to the exhaust gasses, which can include water, soot, chemicals, and high temperatures.

FIG. 3 illustrates a cross-sectional view of the flow restrictor 22 of FIG. 2, in a configuration with three connecting portions. The flow restrictor 22 can be made from any suitable material such as metal, or molded plastic, for example. Each connecting portion 118, 122, 126, can be substantially cylindrical and include a coupling feature 130, configured to engage and seal the supply conduit 58 at the respective connecting portion. The coupling feature 130 can include a ramp 134 and a ridge 138. The ramp 134 is configured to allow the respective section of the supply conduit 58 to slide onto the connecting portion, while the ridge 138 is configured to prevent the respective section of the supply conduit 58 from sliding off of the connecting portion. It is contemplated that each connecting portion 118, 122, 126, can include multiple coupling features 130 disposed axially along the respective connecting portion 118, 122, 126, to further engage and seal the supply conduit 58 thereto.

The first connecting portion 118 can define a first orifice 142 having an inner diameter and defining a first flow path 144 configured to convey the air from the intake section 82 to the second and third connecting portions 122. The first flow path 144 can extend along the first flow axis 128. The second and third connecting portions 122, 126 can define second and third orifices 146, 152 having inner diameters with cross-sectional areas, and defining second and third flow paths 148, 152 configured to convey the air from first flow path 144 to the first and second conveying sections 90, 98. The second and third flow paths can extend along the second flow axis 132. The flow restrictor 22 can include a first restricting member 154, defining a first restricting orifice 158. The first restricting member 154 can be positioned in one of the second and third connecting portions 122, 126. The first restricting orifice 158 has a cross-sectional area smaller than the cross-sectional areas of inner flow paths 146, 150, and is configured to reduce propagation of pressure fluctuations, or pressure waves, between the first and second conveying portions 90, 98. The flow restrictor 22 can also include a second restricting member 162, defining a second restricting orifice 166. The second restricting member 162 can be positioned in the other of the second and third connecting portions 122, 126. The second restricting orifice 166 has a cross-sectional area smaller than the cross-sectional areas of inner flow paths 146, 150, and is configured to further reduce propagation of pressure fluctuations, or pressure waves, between the first and second conveying portions 90, 98. The first and second restricting orifices 158, 166 are illustrated as cylindrical orifices, but it is contemplated that other shapes may be used to disrupt the propagation of pressure fluctuations. The first and second restricting orifices 158, 166 are illustrated as centrally aligned along the second flow axis 132, but it is contemplated that other configurations, may be used, such as offsetting the restricting orifices 158, 166 from the second flow axis 132, offsetting the restricting orifices 158, 166 from each other, or both for example.

FIG. 4 illustrates the SAIS 18 in the second configuration with flow restrictor 22a, which can include a main body 114a configured to be located between the intake section 82 and the first injecting end 94. The flow restrictor 22a is illustrated in more detail in FIG. 5. The main body can be substantially cylindrical and disposed about a flow axis 176. The main body 114a can include a first connecting portion 170 and a second connecting portion 174 opposite the first connecting portion 170 and fluidly coupled to allow air to flow from the first connecting portion 170 to the second connecting portion 174. The first connecting portion 170 can be coupled to the intake section 82, and thus coupled to the supply conduit 58 proximal to the intake end 86, while the second connecting portion 174 can be coupled to the first conveying section 90, and thus coupled to the supply conduit 58 proximal to the first injecting end 94.

The flow restrictor 22a is illustrated as a straight connector, but may also include an angle between the first connecting portion 170 and the second connecting portion 174. A second flow restrictor 22a can also be located between the intake section 82 and the second injecting end 102. By locating the flow restrictor 22a in the supply conduit between the intake section 82 and the first conveying section 90, the interior of the flow restrictor 22a is primarily exposed to the fresh air from outside the engine. This minimizes exposure to the exhaust gasses, which can include water, soot, chemicals, and high temperatures.

Figure 5:
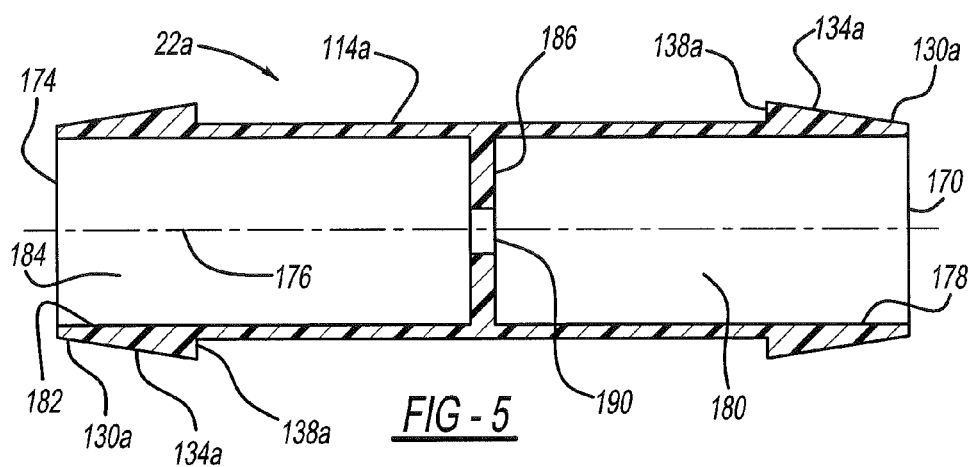
FIG. 5 is a cross-section view of the feed tube restrictor of FIG. 4.

FIG. 5 illustrates a cross-sectional view of the flow restrictor 22a of FIG. 4. The flow restrictor 22a can be made from any suitable material such as metal, or molded plastic, for example. Each connecting portion 170, 174 can include a coupling feature 130a, configured to engage, and seal the supply conduit 58 at the connecting portion 170, 174. The coupling feature 130a can include a ramp 134a and a ridge 138a. The ramp 134a is configured to allow the respective section of the supply conduit 58 to slide onto the connecting portion, while the ridge 138a is configured to prevent the respective section of the supply conduit 58 from sliding off of the connecting portion. It is contemplated that each connecting portion 170, 174 can include multiple coupling features 130a disposed axially along the respective connecting portion 170, 174 to further engage and seal the supply conduit 58 thereto.

The first connecting portion 170 can define a first orifice 178 having an inner diameter defining a first flow path 180 configured to convey the air from the intake section 82 to the second connecting portion 174. The first flow path 180 can extend along the flow axis 176. The second connecting portion 174 can define a second orifice 182 having an inner diameter defining a second flow path 184 having a cross-sectional area, and configured to convey the air from the first flow path 180 to the first conveying section 90. The second flow path 184 can extend along the flow axis 176. The flow restrictor 22a can include a first restricting member 186, defining a first restricting orifice 190. The first restricting orifice 190 has a cross-sectional area smaller than the cross-sectional area of the second flow path 184, and is configured to reduce propagation of pressure fluctuations, or pressure waves, between the first and second conveying portions 90, 98. The flow restrictor 22a is illustrated as including a single restricting member with a single restricting orifice, but a restricting member can also include multiple orifices. The flow restrictor 22a can also include multiple restricting members with one or more restricting orifices. The restricting orifice 190 is illustrated as a cylindrical orifice, but it is contemplated that other shapes may be used to disrupt the propagation of pressure fluctuations. The restricting orifice 190 is illustrated as centrally aligned along the flow axis 176, but it is contemplated that other configurations, may be used, such as offsetting the restricting orifice 190 from the flow axis 176 for example.

FIG. 6 illustrates the SAIS 18 in the third configuration with flow restrictor 22b, which can include a main body 114b configured to be located between the intake section 82 and the first injecting end 94. Flow restrictor 22b is shown in more detail in FIGS. 7 and 8. Flow restrictor 22b can be a gasket located between the first injecting end 94 and the first feed valve 74. The flow restrictor 22b can be located between the first injecting end 94 and the first pressure measuring device 66. A second of the flow restrictor 22b can be located between the second injecting end 102 and the second feed valve 78. The second of the flow restrictor 22b can be located between the second injecting end 102 and the second pressure measuring device 70.

Figure 7:
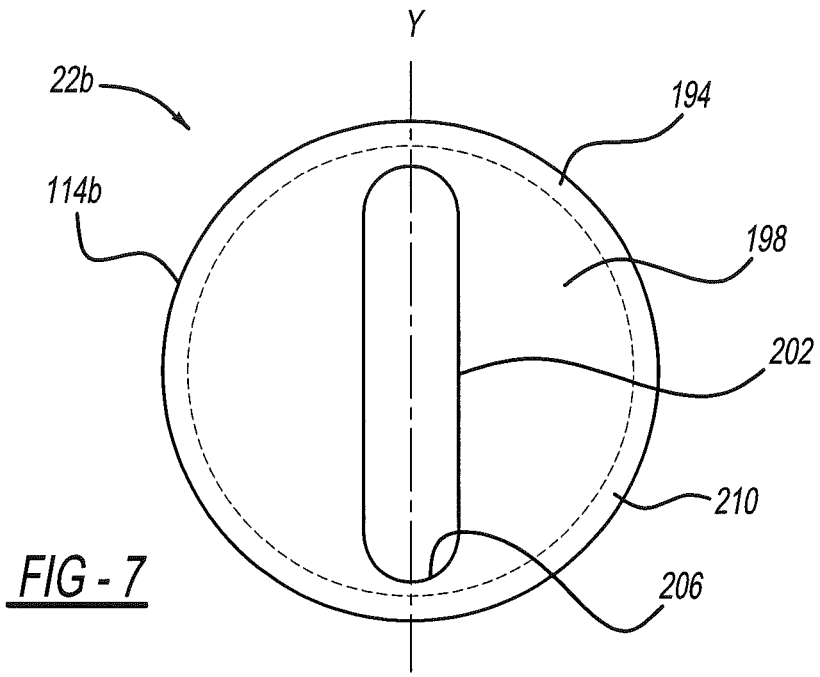
FIG. 7 is a front view of the feed tube restrictor of FIG. 6.
Figure 8:
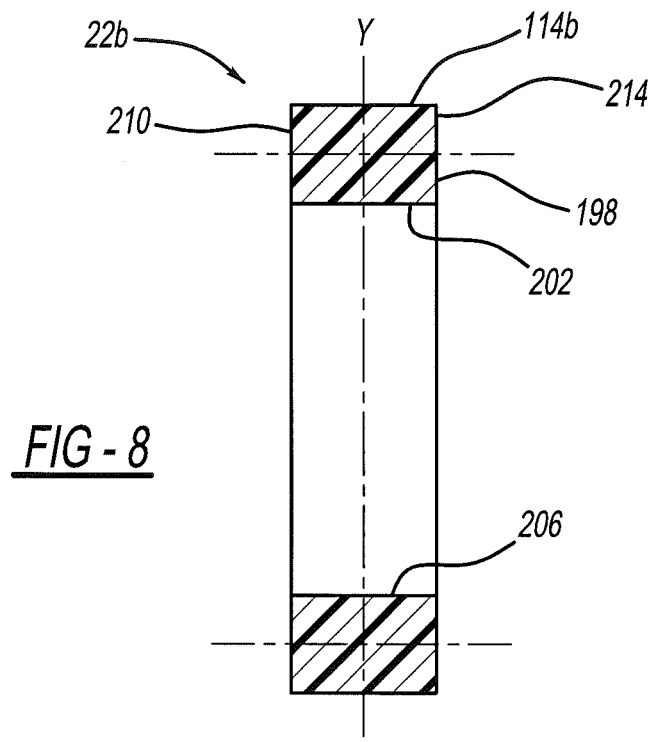
FIG. 8 is a cross-section view of the feed tube restrictor of FIG. 7.

FIG. 7 illustrates a front view of the flow restrictor 22b of FIG. 6. FIG. 8 illustrates a cross-section view of the flow restrictor 22b. The flow restrictor 22b can be made from any suitable material such as metal, or molded plastic, for example. The main body 114b can include a sealing portion 194 and a restricting portion 198. The restricting portion 198 can define a restricting orifice 202. The restricting orifice 202 can be a slot with the slot being longest along the substantially vertically oriented second axis Y. The slot can be configured to allow combustion products present in the exhaust, such as water, or soot for example, to drain through a bottom portion 206 of the restriction orifice 202. The restricting orifice 202 can be substantially symmetrical about the second axis Y. The restricting portion 198 can also define more than one restricting orifice 202, with at least one of the restricting orifices 202 including the bottom portion 206 for draining combustion products. The sealing portion 194 can include a first connecting portion 210 configured to form a seal between the main body 114b and the supply conduit 58 proximal to the first injecting end 94, and a second connecting portion 214 configured to form a seal between the main body 114b and the supply conduit 58 proximal to the intake end 86.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A flow restrictor for a secondary air injection system of a multiple cylinder internal combustion engine including a supply conduit with an intake end configured to supply air from outside the engine to first and second injecting ends configured to inject the air into an exhaust of first and second cylinder heads of the engine, and a conveying section between the intake end and the first and second injecting ends, the flow restrictor comprising:
 a main body including a first connecting portion, a second connecting portion, and a restricting member located within one of the first and second connecting portions and defining a restricting orifice configured to reduce propagation of pressure fluctuations between the first injecting end the second injecting end when the flow restrictor is connected to the secondary air injection system;
 wherein the main body is configured to be located between the intake end and the first injecting end;
 wherein the first connecting portion is configured to connect to, and form a seal with, the supply conduit proximal to the intake end and the second connecting portion is configured to connect to, and form a seal with, the supply conduit proximal to the first injecting end; and
 wherein the flow restrictor is configured to be located between the intake end of the supply conduit and a pressure sensing device located in the conveying section.

2. The flow restrictor of claim 1, wherein the first connecting portion defines a first orifice, the second connecting portion defines a second orifice fluidly coupled to the first orifice, and the restricting orifice is smaller than the first and second orifices.

3. The flow restrictor of claim 1, wherein the flow restrictor is a gasket configured to be located between the first injecting end and a pressure sensing device located in the conveying section, the first connecting portion of the gasket forms a seal between the main body and the supply conduit proximal to the conveying section and the second connecting portion of the gasket forms a seal between the gasket and the supply conduit proximal to the first injecting end, the restricting orifice is defined by a restricting surface that extends radially inward from the first and second connecting portions.

4. The flow restrictor of claim 1, wherein the restricting orifice is a longitudinally extending slot.

5. The flow restrictor of claim 1, wherein the main body includes:
 a third connecting portion configured to connect to the supply conduit proximal to the second injecting end, the restricting orifice is configured to reduce propagation of pressure fluctuations between the second connecting portion and the third connecting portion.

6. The flow restrictor of claim 5, wherein the restricting orifice is disposed in one of the second and third connecting portions.

7. The flow restrictor of claim 5, wherein a first of the restricting orifice is disposed in the second connecting portion and a second of the restricting orifice is disposed in the third connecting portion.

8. The flow restrictor of claim 5, wherein the engine is a V-engine, the first injecting end is configured to inject air into the exhaust of a first cylinder head on one side of the V-engine and the second injecting end is configured to inject air into the exhaust of a second cylinder head on an opposite side of the V-engine.

9. A secondary air injection system for an internal combustion engine comprising:
 a supply line configured to supply air from outside the engine to an exhaust of at least two cylinder heads of the engine, the supply line including:
  an intake portion; and
  at least two injection portions, each injection portion has an intake end coupled to the intake portion, an injecting end coupled to the exhaust of one of the cylinder heads, and a flow path extending between the intake end and the injecting end;
 at least one flow restrictor, each flow restrictor is located between the injecting ends of the injection portions, the flow restrictor defining an orifice of a cross-sectional area smaller than a cross-sectional area of the flow path and configured to minimize propagation of pressure fluctuations between the cylinder heads; and
 at least two pressure measuring devices, each pressure measuring device is located along one of the injection portions between the intake and injecting ends of the corresponding injection portion.

10. The secondary air injection system of claim 9, wherein the flow restrictor includes:
 a first end coupled to one of the injection portions and defining a first opening having a cross-sectional area;
 a second end coupled to a different one of the injection portions and defining a second opening having a cross-sectional area and in fluid communication with the first opening;
 a third end coupled to the intake portion and defining a third opening in fluid communication with the first and second openings; and
 a restriction member disposed within at least one of the first and second ends, the restriction member defining a restriction orifice having a cross-sectional area smaller than the cross-sectional areas of the first and second openings, and configured to limit flow between the first and second ends.

11. The secondary air injection system of claim 9, wherein the at least one flow restrictor is located along one of the injection portions and between the intake end of the one injection portion and the corresponding one of the pressure measuring devices.

12. The secondary air injection system of claim 9, further comprising at least two feed valves, each feed valve is located along one of the injection portions and between the injecting end of the one injection portion and the corresponding one of the pressure measuring devices, wherein the at least one flow restrictor includes at least two gaskets, each gasket is located between the injecting end of the one injection portion and a corresponding one of the feed valves, each gasket includes a sealing portion and a restricting portion, the restricting portion defining a flow slot, the flow slot being longer along a vertically oriented axis and substantially symmetrical about the axis.

13. A flow restrictor for a secondary air injection system of a multiple cylinder internal combustion engine including a supply conduit with an intake end configured to supply air from outside the engine to first and second injecting ends configured to inject the air into an exhaust of first and second cylinder heads of the engine, and a conveying section between the intake end and the first and second injecting ends, at the first and the second injecting ends are first and second feed valves respectively that permit airflow to first and second cylinder heads from the supply conduit, the flow restrictor comprising:
a main body including a first connecting portion, a second connecting portion, and a restricting member located within one of the first and second connecting portions and defining a restricting orifice configured to reduce propagation of pressure fluctuations between the first injecting end the second injecting end when the flow restrictor is connected to the secondary air injection system;
wherein:
the main body is configured to be located between the intake end and the first injecting end;
the first connecting portion is configured to connect to, and form a seal with, the supply conduit proximal to the intake end and the second connecting portion is configured to connect to, and form a seal with, the supply conduit proximal to the first injecting end; and
the restricting orifice is between the intake end of the supply conduit and at least one of the first and second feed valves.

14. A flow restrictor for a secondary air injection system of a multiple cylinder internal combustion engine including a supply conduit with an intake end configured to supply air from outside the engine to first and second injecting ends configured to inject the air into an exhaust of first and second cylinder heads of the engine, and a conveying section between the intake end and the first and second injecting ends, at the first and the second injecting ends are first and second feed valves respectively that permit airflow to first and second cylinder heads from the supply conduit, the flow restrictor comprising:
a main body including a first connecting portion, a second connecting portion, and a restricting member located within one of the first and second connecting portions and defining a restricting orifice configured to reduce propagation of pressure fluctuations between the first injecting end the second injecting end when the flow restrictor is connected to the secondary air injection system;
wherein:
the main body is configured to be located between the intake end and the first injecting end;
the first connecting portion is configured to connect to, and form a seal with, the supply conduit proximal to the intake end and the second connecting portion is configured to connect to, and form a seal with, the supply conduit proximal to the first injecting end; and
the restricting orifice is between the first feed valve and a first injection end of the supply conduit.

15. The flow restrictor of claim 14, wherein the restricting orifice is a first restricting orifice of a first flow restrictor, the secondary air injection system further comprising a second flow restrictor defining a second restricting orifice between the second feed valve and a second injection end of the supply conduit.

16. The flow restrictor of claim 14, wherein the flow restrictor is a gasket configured to be located between the first injecting end and a pressure sensing device located in the conveying section, the first connecting portion of the gasket forms a seal between the main body and the supply conduit proximal to the conveying section and the second connecting portion of the gasket forms a seal between the gasket and the supply conduit proximal to the first injecting end, the restricting orifice is defined by a restricting surface that extends radially inward from the first and second connecting portions.

* * * * *